H. T. OLIVER.
CAMERA FOCUSING DEVICE.
APPLICATION FILED APR. 18, 1912.
1,076,694.
Patented Oct. 28, 1913.
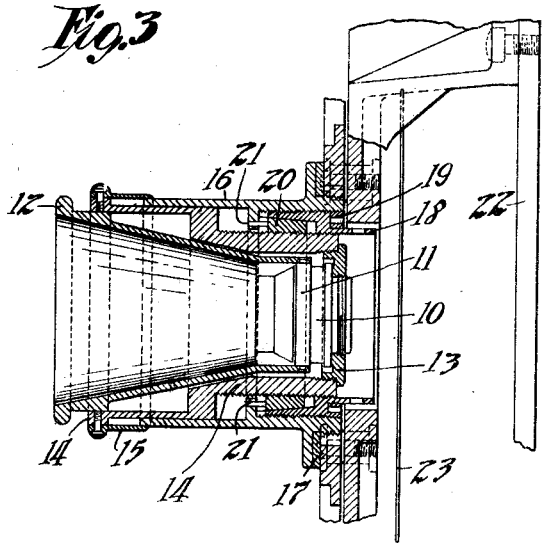
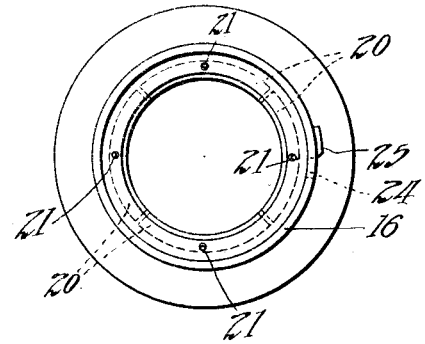
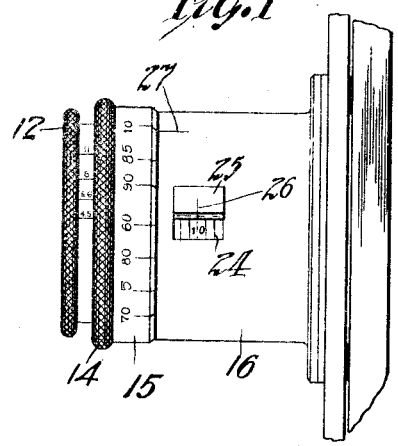
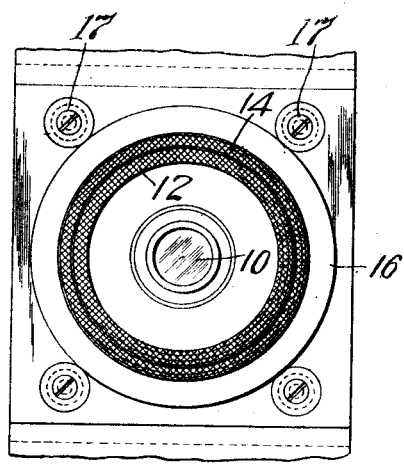
Witnesses:
Robert M. Sutphen
George F. Scull
Henry T. Oliver
Inventor:
by Frank L. Dyer
His Atty

UNITED STATES PATENT OFFICE.

HENRY T. OLIVER, OF NEWARK, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

CAMERA FOCUSING DEVICE.

1,076,694.  Specification of Letters Patent.  Patented Oct. 28, 1913.

Application filed April 18, 1912. Serial No. 691,677.

*To all whom it may concern:*

Be it known that I, HENRY T. OLIVER, a citizen of the United States, residing at Newark, in the county of Essex, State of New Jersey, have invented certain new and useful Improvements in Camera Focusing Devices; and I do declare the following to be a full, true, and exact description of the said invention, such as will enable others skilled in the art to which it appertains to make use of the same.

This invention relates to a device for focusing a lens in a camera or other similar instrument. In certain types of cameras, the lenses are mounted to be moved toward and away from the sensitized plate and the camera is provided with fixed marks, each mark indicating a position at which the lens must be set to focus an object at a distance from the camera indicated by that mark. The operator estimates the distance of the object from the camera and then sets the lens in a position to correspond to that distance as indicated by marks on the instrument. My device is of this class, but I have provided an exceedingly simple and yet exceedingly accurate device of this type which is especially useful in very short focus lenses, such as are used in motion picture cameras, in which only a very slight movement of the lens toward or away from the focal plane is required for considerable variations in the distance of the object from the camera.

With these and other objects in view, the invention consists of certain novel features of construction and arrangement of parts which will be more fully described and pointed out in the appended claims.

In the drawings Figure 1 is a side elevation of the lens mount attached to a portion of a motion picture camera. Fig. 2 is a front elevation thereof. Fig. 3 is a longitudinal section of the mount showing a fragmentary portion of the mechanism of a motion picture camera to which the mount, as illustrated, is attached. Fig. 4 is a front view of the mount with the lens and its barrel removed, to show the arrangement of the split nut device.

The corresponding parts are referred to both in the drawings and following description by similar reference characters.

In the drawings 10 represents the usual lens in its holders. This lens may be of any type, but as shown is of the ordinary combination type with a diaphragm between the lens. This diaphragm is located at 11 and has attached thereto a tubular member 12 which, when rotated, closes or opens the diaphragm in the usual manner. The lens 10 is mounted in a ring 13 attached to a barrel 14, which has fastened to it at 15 a sleeve for a purpose to be hereafter pointed out. The barrel 14 is threaded externally as shown in Fig. 3, and fits in a tube 16 which is fastened to the front of the camera by screws 17 in the ordinary manner. The tube 16 is internally threaded and has fitting in it a circular nut 18, and a jam nut 19. The circular nut 18 has a conical bore into which is threaded a tapered circular split nut 20 having pins 21 engaging with openings in a rib in tube 16 to prevent the rotation of the nut 20. The nut 20 is internally threaded and so far as the adjustment of the lens is concerned, is practically a part of the tube 16, as is the circular nut 18, and I have used the expression "tubular member" in the appended claims to indicate generally the tube 16 with the internal threads integral with it, or as attached to it, as shown in the drawings. The threads on the barrel 14 engage with the threads on the nuts 18 and 20, so that, when the barrel 14 is rotated, the barrel, with the holder 13 and the lens 10, is moved toward or away from the focal plane of the sensitized surface. I have illustrated at 22 a portion of the aperture plate of the ordinary motion picture camera behind which is held the film at the time the photographs are being taken, and 23 represents the ordinary rotary shutter of such a camera.

In the side of the tube 16 I have cut an opening 24 and directly above this opening have mounted a member 25 having thereon an index mark 26. On that portion of the barrel 14 which passes across this opening when the barrel is screwed in or out of the tube 16, I have placed a series of index marks or lines extending entirely around the barrel, so that when one of these marks is brought opposite the index mark 26, it will be shown that the lens is located in a predetermined position. I have also placed at the edge of the periphery of the tube 16 a second index mark 27, and have placed on the periphery of the sleeve 15 a second series of index marks, any one of which, when brought opposite the index mark 27, indicates the relative location of the lens to the focal plane of the sensitized surface.

As a controlling means for the diaphragm 11, the cylinder 12 is rotatably mounted in a bore of the barrel 14, so that when the barrel 14 is rotated, the cylinder 12 is carried with it, and therefore the opening of the diaphragm 11 is not disturbed. The cylinder 12, however, fits rather loosely in the barrel 14, so that the rotation of the cylinder 12 does not affect the position of the barrel 14. As shown, the cylinder 12 projects beyond the barrel 14 so that it may be grasped by the hand of the operator. While I have found this arrangement for controlling the diaphragm the most convenient, I do not wish to confine myself to the particular arrangement shown. All that is required is a handle controlled by the operator, turning with the barrel 14 when the latter is turned, but free to turn in the barrel 14, when adjusting the diaphragm.

The split nut 20 and the adjusting nut 18 are provided to take up any wear in the threads of the barrel 14, so that the barrel is always held relatively tightly in the tube 16. By turning the nut 18 it will be seen that the sections of the split nut 20 will be moved radially by reason of the tapered engaging surfaces between 18 and 20, thus tightening the sections on the threads of the barrel 14. This adjustment is a refinement which, of course, is not necessary to the successful operation of my lens mount, and the tube 16 might have internal threads directly upon it to engage with the external threads of barrel 14.

The position of the two sets of index marks is determined by setting up the lens and focusing it very accurately on objects at different distances from the camera. For instance, an object is placed just 25 feet from the camera, and the lens accurately focused thereon by turning the barrel 14 until the image is sharp at the focal plane. A mark or line is then made on the side of the barrel 14 opposite the index mark 26 and extending entirely around the barrel and another mark made on the sleeve 15 opposite the index mark 27. The index marks for other distances are correspondingly located, and it is obvious that all that is required thereafter to focus on an object, say 25 feet from the camera, is to turn the barrel 14 until the index marks for that distance are opposite the index marks 26 and 27.

The index on the side of the barrel 14 serves to indicate roughly the desired setting of the lens, and the index on the sleeve 15, the exact setting. The screw threads on the barrel 14 are very fine, so that a complete turn of the barrel 14 moves the lens longitudinally only a small distance. As is well known, it is quite difficult to bring index marks, such as I have illustrated, in exact alinement and it is therefore desirable to minimize as much as possible the errors arising from this cause. This may be done by making the movement of the index markings very large for a small movement of the lens, which I accomplish by the marks on the sleeve 15. But in moving the lens from one extreme position to the other, the sleeve 15 will make several revolutions and there would be confusion as to the position of the lens when a given mark is opposite the index 27, were it not for the index on the side of the barrel 14. This index indicates directly the position of the lens but only roughly, since any failure to aline a mark thereof with the mark 26 results in an error of like amount in setting the lens. By the use of both indices, a setting may be had which will be very exact and without confusion. The barrel 14 is first turned until the desired distance is indicated at 26 and then adjusted until the same distance is indicated by the mark 27, this last adjustment compensating for any error in the first setting.

For some purposes, the one index device on the side of the barrel 14 will suffice, and indeed, with a coarse threaded barrel 14 and a narrow limit of longitudinal adjustment of the lens 10, the index device on the sleeve 15 will be sufficient. I prefer, however, to use them in combination, the index on the side of the barrel 14 to give a rough and ready adjustment, and the index on the sleeve 15 to give an exact or practically micrometer adjustment.

While I have located my two systems of indices in the most convenient positions, it is obvious that they need by no means be limited to the positions illustrated. All that is essential is that one of them shall mark off directly the longitudinal position of the barrel 14 and the other, the amount of rotation of the barrel 14.

While I have illustrated and described a threaded arrangement for adjusting the relative positions of the lens and the focal plane, I do not wish to be limited to such arrangement.

Many features of my device may be used with any other adjusting device, such, for instance, as the well known rack and pinion, or even without any such device, as when the lens holder is held frictionally in the tube fastened to the camera.

Having now described my invention, what I claim as new and desire to secure by Letters Patent is as follows:

1. In a camera focusing device, an internally threaded tubular member adapted to be attached to the camera, an externally threaded barrel in said tubular member having the threads thereof engaging with the threads of said tubular member, a lens in said barrel, and an index device to permit the location of said barrel longitudinally in said tubular member at predetermined positions, substantially as described.

2. In a camera focusing device, an internally threaded tubular member adapted to be attached to the camera, an externally threaded barrel in said tubular member having the threads thereof engaging with the threads of said tubular member, a lens in said barrel, and a diaphragm controlling device carried by said barrel, substantially as described.

3. In a camera focusing device, a tubular member adapted to be attached to the camera, a barrel movably mounted within said tubular member, a lens in said barrel, means operated by the rotation of said barrel to adjust the longitudinal relation of said tubular member and barrel, and an index device on the periphery of said barrel to locate it in predetermined positions in its rotation within said member, substantially as described.

4. In a camera focusing device, a tubular member adapted to be attached to the camera, said tubular member having an opening in its side and an index mark adjacent to said opening, and a barrel, movable longitudinally within said member, said barrel having a series of index marks adapted to coöperate with the opening and index mark on said tubular member to permit the location of said barrel in predetermined longitudinal relation to said member, substantially as described.

5. In a camera focusing device, a tubular member adapted to be attached to the camera, said member being provided with internal screw threads, and having an opening in its side and an index mark adjacent to said opening and having a second index mark on the periphery thereof, an externally threaded barrel within said member having its threads engaging with the threads of said member, said barrel having a series of index marks adapted to coöperate with the opening and index mark on the said member to permit the location of the said barrel roughly in predetermined longitudinal relation to said member, and having a second series of index marks on the periphery thereof adapted to coöperate with the second index mark on said member to permit the location of said barrel in exact predetermined longitudinal relation to said member, substantially as described.

6. In a camera focusing device, a tubular member adapted to be attached to the camera, a barrel movably mounted in said member and adjustable longitudinally thereof by the rotation of said barrel, a lens in said barrel, an adjustable diaphragm for said lens and means for adjusting said diaphragm, comprising a hollow cylinder rotatably mounted in said barrel, substantially as described.

7. In a camera focusing device, a tubular member adapted to be attached to the camera, a barrel movably mounted in said member and adjustable longitudinally thereof by the rotation of said barrel, a lens in said barrel, an adjustable diaphragm for said lens and means for adjusting said diaphragm, comprising a hollow cylinder rotatably mounted in said barrel and projecting beyond the end thereof, substantially as described.

8. In a camera focusing device, a tubular member adapted to be attached to the camera, a barrel movably mounted in said member and adjustable longitudinally thereof by the rotation of said barrel, a lens in said barrel, an adjustable diaphragm for said lens and adjusting means for said diaphragm, mounted in said barrel and normally turning therewith and rotatably adjustable in relation thereto, substantially as described.

9. In a camera focusing device, a tubular member adapted to be attached to the camera, a barrel longitudinally movable within said member, and an index device to permit the location of said barrel longitudinally in said tubular member at predetermined positions, substantially as described.

10. In a camera focusing device, a tubular member adapted to be attached to the camera, said member having an opening in its side and an index mark adjacent to said opening, a barrel longitudinally movable within said member, and a lens in said barrel, said barrel having index marks thereon adapted to coöperate with the opening and index mark on said tubular member to permit the location of said barrel and said member at predetermined positions, substantially as described.

11. In a camera focusing device, an internally threaded tube adapted to be attached to the camera, an internally and externally threaded adjusting nut in said tube and engaging the threads thereof, said adjusting nut having a conical bore, an internally threaded split nut having a conical surface on its exterior, said conical surface engaging the conical bore of the adjusting nut, connections between said split nut and said tube to prevent relative rotation thereof, an externally threaded barrel, with its threads engaging the internal threads of the said split nut and the said adjusting nut and a lens in said barrel, substantially as described.

12. In a camera focusing device, a tube adapted to be attached to the camera, a barrel within said tube, a lens in said barrel, screw thread connections between said tube and said barrel and means to tighten the contact between the threads of said connections, substantially as described.

13. In a camera focusing device, a tube adapted to be attached to the camera, an internally threaded split nut attached to and inside of the said tube, a barrel inside said tube and split nut and having external threads engaging with the internal threads of the split nut and means to close in the split nut to clamp the threads thereof on the threads of the said barrel, substantially as described.

This specification signed and witnessed this 16th day of April 1912.

HENRY T. OLIVER.

Witnesses:
GEORGE F. SEULL,
W. LAWSON DYER.